May 4, 1965

W. L. ROEVER 3,181,644

APPARATUS FOR PLOTTING SEISMIC DATA

Filed Dec. 30, 1960

INVENTOR:
W. L. ROEVER
BY:
HIS ATTORNEY

United States Patent Office 3,181,644
Patented May 4, 1965

3,181,644
APPARATUS FOR PLOTTING SEISMIC DATA
William L. Roever, Bellaire, Tex., assignor to Shell Oil Company, New York, N.Y., a corporation of Delaware
Filed Dec. 30, 1960, Ser. No. 79,843
2 Claims. (Cl. 181—.5)

This invention pertains to seismic exploration and more particularly to an apparatus for simultaneously plotting a time squared, distance squared curve for a continuous seismic profiling system used in marine surveying.

In marine seismic profiling it is the customary practice to stream a plurality of detectors attached to a supporting cable behind a slowly moving boat while generating a series of recurrent acoustical impulses. The acoustical impulses are transmitted downwardly into the formations which lay below the body of water and are reflected upwardly by the interfaces that occur between different formations. The reflected impulses are received by the detectors and converted to signals which are then recorded. This provides a profile of the formations underlying the body of water which accurately illustrates the various interfaces between the formations as well as travel times which correspond to the depth of these formations.

In the past, when shallow bodies of water have been surveyed or surveys were made of formations having only slight dips, multiple reflections have been a serious problem. These multiple reflections occur between the floor of the body of water and the water-air interface at the surface or between shallow formations and the water-air interface. In either case the multiple reflections result in signals which have the appearance of signals reflected from deeper interfaces. One method for determining whether a signal indicates an actual reflection from a deeply buried formation or merely multiple reflections of the original acoustical impulse is to produce a time-squared, distance-squared curve hereinafter referred to as a $T^2X^2$ plot. Such a curve permits one to accurately determine the average velocity to the various formations.

Since the average acoustic velocity in the earth usually increases with depth, an acoustic impulse which travels to a deep reflector usually travels with a higher average velocity than an impulse which travels to a shallower reflector. On a $T^2X^2$ plot, the times at which an acoustic impulse which has been reflected from a layer arrives at detectors located at different increments of $X^2$ appear along a straight line having a slope proportional to the square of the average velocity at which the wave front traveled. The arrivals resulting from an acoustic impulse which has undergone multiple reflections at relatively shallow depths fall on a line indicating a relatively low average velocity.

In the past, it has been the practice to analyze the recorded data to obtain the required information and then hand-plot the time-squared, distance-squared curves. This is a very time-consuming operation and requires a great deal of attention if errors are to be avoided.

Accordingly, it is the principal object of this invention to provide a unique method of recording a distance-squared time-squared seismic profile.

A further object of the present invention is to provide a method for conducting a seismic survey in which a succession of acoustic impulses are generated and received at spaced locations, and electrical signals corresponding to the received acoustic impulses are recorded on a rectangular grid at distances along one axis proportional to the square of the distance between the generation and the reception of the acoustic impulses and at distances along an orthogonal axis proportional to the square of the time between the generation and the reception of the impulses.

A further object of the present invention is to provide an apparatus comprising a sound source for initiating a succession of acoustic impulses, transducers at spaced locations for receiving the acoustical impulses and transducing them to electrical signals and a recording system for recording the electrical signals at distances along a pair of orthogonal axes, said distances being proportional to, respectively, the square of the time between the initiation and the reception of the acoustic impulses and the square of the distance between the initiation and the reception of the acoustic impulses.

The above objects are achieved by using at least one source of acoustic impulses arranged to produce a succession of impulses and at least one acoustic transducer for producing electrical signals corresponding to acoustic impulses. The source and transducer are disposed in a series of locations spaced at increments of the square of the distance between them. A record-marking device is operated to mark a record with indications of both the patterns of the transducer signals and the times of the initiation of the acoustic impulses to which the transducer signals correspond. A visual display is produced by marking the record with a visual indication of the transducer signal while altering the relative displacement between the record and the record marker. The relative displacement is altered in one direction by an amount proportional to the square of the time between the initiation and the reception of the acoustic impulses, and is altered in an orthogonal direction by an amount proportional to the square of the distance between the points at which the source and transducer were disposed.

In a preferred embodiment, an acoustic transducer is anchored in a body of water and connected to supply its electrical output signals to a recording system which is located on a mobile vessel. The transducer signals may be supplied to the recording system by means of radio transmission or a cable extending from the mobile vessel to the anchored transducer. A source of acoustic impulses is connected to maintain a fixed position relative to the mobile vessel and is arranged to produce a succession of acoustic impulses. Particularly, where the transducer signals are supplied to the recording system by radio, it is desirable to arrange the sound source to produce the impulses at regular intervals, for example, one each second. Where the initial recording is a visual recording, the recording system preferably contains a weightless record-marking element, such as the beam of an oscilloscope or a galvanometer, for marking a suitable record, such as a film.

Where an oscilloscope is used as the recording means, signals coincident with the initiation of the acoustic impulses are supplied as trigger signals to a circuit for generating a voltage which increases proportional to the square of time. The voltage produced by that circuit is employed to sweep the beam of the oscilloscope through a displacement which is continuously proportional to the square of the time elapsed after the initiation of each of the acoustic impulses. The transducer signals are employed to vary the intensity of the beam of the oscilloscope by amounts proportional to the intensity of the acoustic energy arriving at the transducer.

Where a cable is extended from the mobile vessel to the transducer, the cable is used as a drive to advance a cam by amounts proportional to the amount of cable extended between the mobile vessel and the location of the transducer. The cam is provided with a signal-generating means, such as notches for closing an electrical switch, positioned to correspond to equal increments of $X^2$ where X is an increment of the distance between the source of acoustic impulses and the transducer. The recording system is connected to receive signals from the cam and to be actuated by them to record a sweep trace of the oscilloscope beam (which varies in intensity in correspondence with the intensity of the transducer signals), and then advance the film, in a direction perpendicular to the recorded trace, to position the film for the recording of the next sweep trace when the system is actuated by the next signal from the cam. Since the next signal from the cam will actuate the recording system to record the arrival of acoustic impulses at a receiver spaced from the point of initiation by one additional increment of $X^2$, the film will be advanced by equal increments of a distance proportional to $X^2$.

The above objects and advantages of this invention will be more easily understood from the following detailed description of a preferred embodiment when taken in conjunction with the attached drawing, in which.

Figure 1:
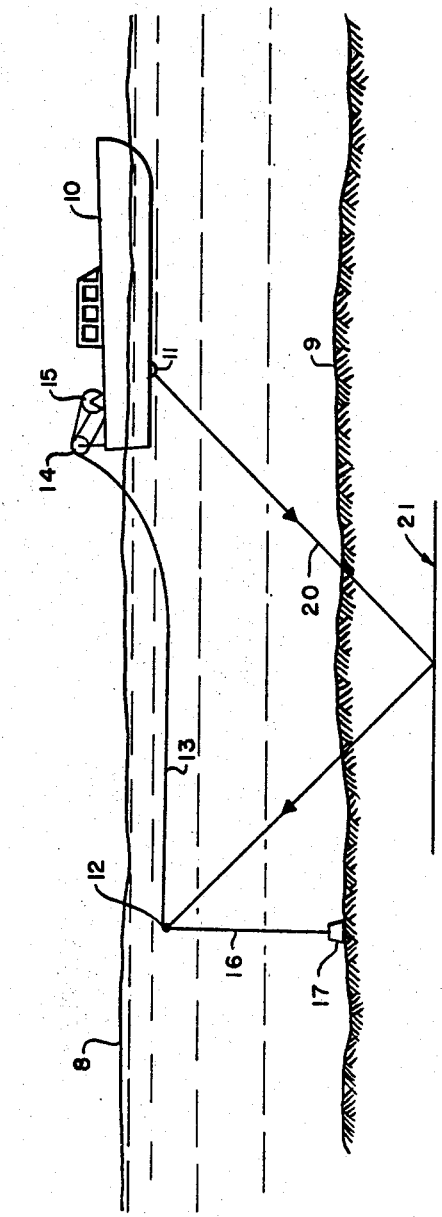
FIGURE 1 illustrates the anchored detector and vessel on which the source of acoustical impulses is mounted.

Referring to FIGURE 1, there is shown a body of water having a surface 8 and a floor or bottom 9. A vessel 10 is shown floating on the surface 8 and has a source of acoustical impulses 11 disposed on its bottom. The source of acoustical impulses may be one of several well known designs, for example, it may be a hammer striking an anvil or spark discharge device which is intermittently energized to generate an acoustic impulse or train of acoustical impulses. The detector 12 is of the transducer type which is capable of receiving impulses and converting them to related electrical signals. The detector 12 is shown attached to an anchor line 16 which has a suitable weight or anchor 17 attached to its lower end. The detector 12 is coupled to the recording circuits disposed on the vessel 10 by a cable 13 which passes over a measuring sheave 14. The cable is stored on a reel 15 on the vessel 10 with the reel being capable of maintaining sufficient tension on the cable to limit the amount of slack therein while at the same time freely paying out additional cable as the vessel 10 moves away from the detector 12. The vector 20 illustrates the path of an acoustical impulse from the source 11 through the bottom 9 to an innerface 21 from which it is reflected upwardly to the detector 12. As is seen in FIGURE 1, the innerface 21 is horizontal to the floor or bottom of the body of water.

Figure 2:
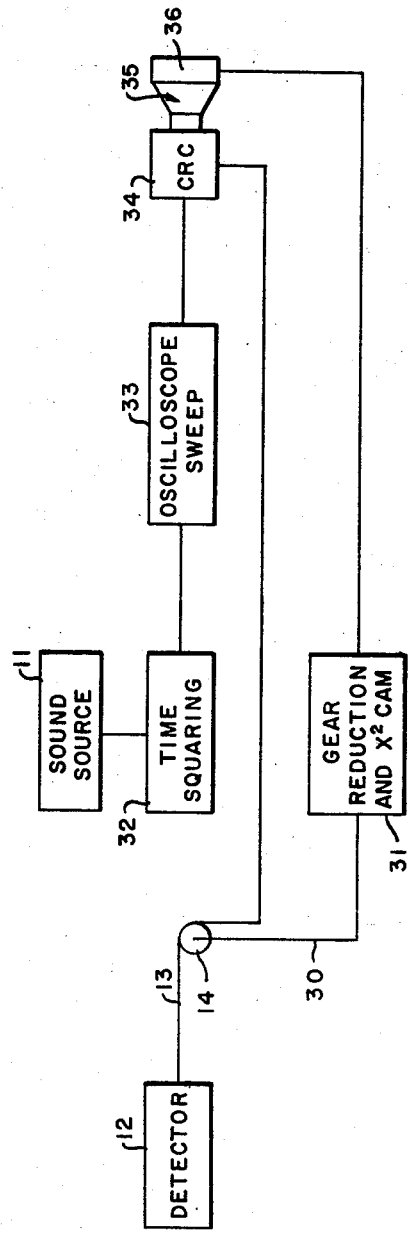
FIGURE 2 is a block diagram of a recording circuit used with the apparatus of FIGURE 1.

Referring to FIGURE 2, there is shown a block diagram of a system in which the sound source 11 is shown coupled to a time squaring circuit 32. The time squaring circuit generates a signal proportional to the square of the time elapsed since initiation of the impulse by the source 11. Various well known circuits may be used for the time squaring circuit, for example, the circuit used in a vacuum tube voltmeter with a true root means square output may be used. The time squaring circuit 32 is coupled to the circuit 33 which controls the sweep of the oscilloscope 34. Thus the sweep of the oscilloscope will be proportional to the time-squared function. The cable 13 used to couple the detector 12 to the recording circuit passes over a measuring sheave 14. The measuring sheave 14 is coupled by a lead 30 to a gear reduction 31 which drives a cam to supply signals in equal increments of $X^2$ where X is the distance between the source 11 and detector 12.

The cam periphery is notched at points corresponding to increments of $X^2$. As the cam rotates, each of the notches closes a switch to actuate the recording of the arrivals of the acoustic impulses from the next firing of the sound source. For example, where a 2500-foot cable is used, the maximum distance ($X_{max}$) is 2500 feet, and $X^2_{max}$ is 6,250,000. Where the sweep traces of an oscilloscope are recorded on a film which can accommodate 600 sweep traces, this means that the interval which can conveniently be used for $X^2$ is 6,250,000/600, or about $10^4$. The sheave-to-cam gearing can be arranged so that $X_{max}$ corresponds to one revolution of the cam and each notch on the cam corresponds to an interval of $10^4$. The closing of the switch by the cam in gear reduction 31 is used to control the film advancing mechanism 36 of a camera 35. The camera 35 is disposed to photograph the face of the oscilloscope 34 and thus record the record displayed thereon.

Figure 3:
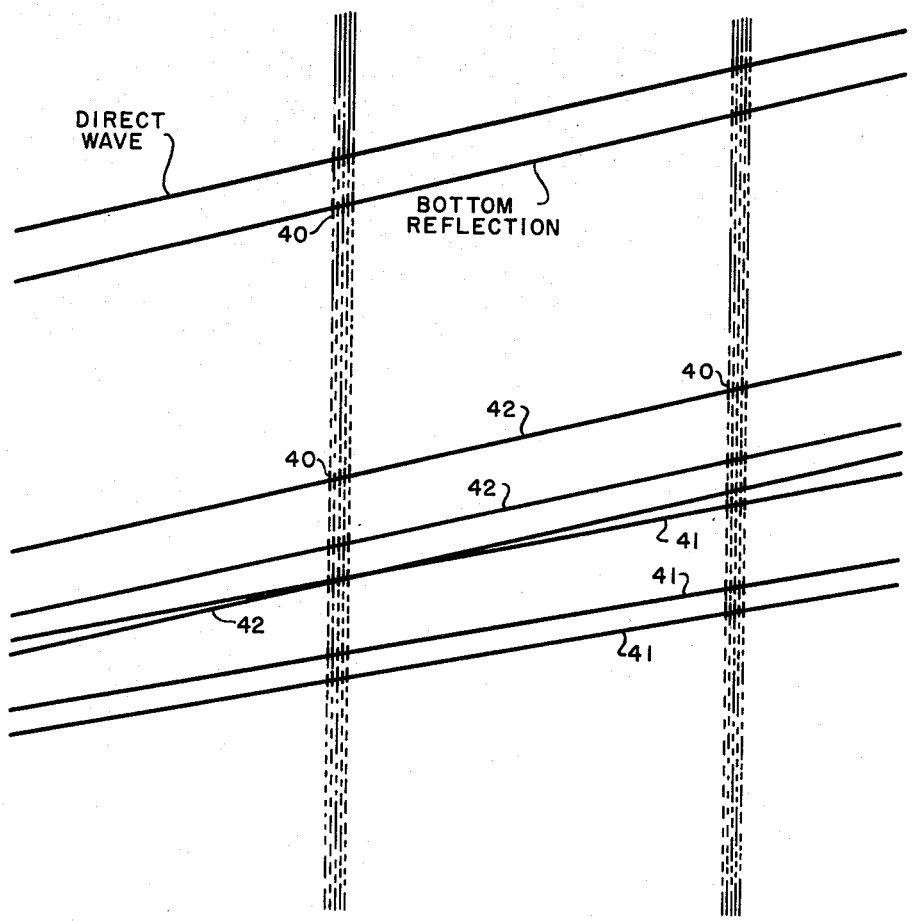
FIGURE 3 illustrates the timed-squared, distance-squared curve obtained with this invention.

When the above-described apparatus is operated by anchoring the detector 12 and slowly moving the vessel 10 away from it, one will obtain a film record having a series of lines of varying width. The varying width of the lines illustrates the varying intensity of the oscilloscope beam which of course is proportional to the intensity of the acoustical energy arriving at the detector 12. This film will have an appearance similar to the record shown in FIGURE 3 in which the wide sections 40 illustrate the change in intensity of the detector signal as it is displayed on the oscilloscope and recorded on the film. When sections 40 are connected by lines 41 the lines will represent the velocity of the acoustical impulses through the earth to a particular formation buried below the surface of the body of water. The acoustical impulses generated by the source 11 of course travel through the earth to various formations and are reflected upwards to the detector 12 by the interfaces between the different formations. In addition to the true reflected signals there will be a series of signals which appear to be reflected signals but are actually multiple reflections of the original impulse. These multiple reflections of the original impulse are easily detected by drawing a series of lines 42 through the wide sections of recorded line as shown in FIGURE 3. The slope of the lines 42 is then compared with the slope of the lines representing the direct wave and the bottom reflection. If the slope of the lines 42 are substantially the same as the direct wave and bottom reflection the lines 42 represent multiple reflections and not true reflections from an interface. Of course, only a few of the recorded traces are shown in FIGURE 3 in order to simplify the drawing.

The transducers and the transmitters for transmitting the detector signals to the recorder can be known types of devices such as those described in journals and patents in connection with conventional land seismic operations. Where the source is towed away from the detector, the boat can steam at constant speed, and the sheave drive to the cam can be replaced by a clock drive. Where desirable, the cam can be replaced by various units, such as ball and disc integrators, etc., arranged to signal when the detector has moved to an increment of $X^2$. A visual $T^2X^2$ plot inherently provides means for calibration so that absolute values of T and X are not critical. The direct wave through the water and the sea bottom returns to the detector having traveled exclusively through the water layer, which has a known acoustic velocity resulting in a line on a $T^2X^2$ plot having a set slope. The slope of any other reflection event is compared with the slope of these arrivals at known velocity in order to obtain an accurate measurement.

Instead of using a cable to couple the anchored detector to the recording system on the boat 10 the detector signals could be transmitted by radio. The advantage of the radio transmission is the ease with which the boat can tow the source past the detector to obtain first decreasing then increasing increments of $X^2$. A clock for measuring times corresponding to X can be started at the distance selected for $X^2_{max}$, and a two-sided profile can be made by steaming past the anchored detector. Similarly, by towing the detector with a second boat, both the source and the detector can be moved away from a fixed point. This latter procedure has the advantage of causing all of the reflections to come from the same point on the subsurface reflector. With this latter procedure, the problem of slightly dipping reflectors can be handled with much greater ease than it can when the source or the detector location is kept fixed.

Rather than producing the visual recordings in the field, it is anticipated that the field data could be initially placed on tape. In this operation, the recorder will preferably be arranged to advance the record at a constant speed and record both the firing signal and the receiver signal corresponding to each acoustic impulse which is initiated when the source and detector are separated by an increment of $X^2$. A visual recording will be made by a play-back of the signals, for example, through galvanometers arranged so the relative movement of the film and the light are continuously proportional to the square of the time elapsed after the firing signal. Such galvanometers would preferably be arranged to produce a variable area record of the variations in the amplitude of the receiver signal.

Also a sound source, such as a spark or a gas explosion chamber, can be mounted on an anchored float and arranged to initiate successively the acoustic impulses and transmit signals coincident with the initiation of each impulse. The detector can then be towed to the increments of $X^2$ and actuated to record the returns from an acoustic impulse which is initiated while the detector is so positioned.

Likewise, series of detectors can be strung out in a linear array in which at least one detector is located at the end of each increment of $X^2$. The detectors can be individually connected to a series of galvanometers arranged to produce side-by-side traces on a film advanced at a rate proportional to $T^2$. When a shot is fired at X, the returns are recorded as a visual $T^2X^2$ plot in a single operation.

Accordingly this invention should not be limited to the details described and illustrated but only to its broad spirit and scope.

I claim as my invention:

1. An apparatus for producing a time squared distance squared display of seismic data comprising: a source of acoustical impulses; a detector capable of receiving acoustical impulses and converting them to related electrical signals; means coupled to said source and said detector for moving said source and said detector relative to each other while periodically energizing said source to produce acoustical impulses; a circuit means, said source being coupled to said circuit means, said circuit means providing an output signal which increases as the square of the elapsed time since the energizing of the source, an oscilloscope, the output side of said circuit means being coupled to the vertical sweep circuit of said oscilloscope; said detector being coupled to said oscilloscope to vary the intensity of the beam thereof; measuring means for measuring the distance between said source and said detector, said measuring means supplying a signal proportional to the square of the measured distance, recording means, said measuring means being coupled to the record advancing mechanism of said recording means, said recording means recording the events displayed on the oscilloscope after each advance of the record.

2. An apparatus for producing a time squared distance squared display of seismic data from water-covered areas, said apparatus comprising: a source of acoustical impulses disposed on a vessel; a detector capable of receiving acoustical impulses and converting them to related electrical signals; an anchoring means fastened to said detector to maintain said detector in a fixed location; a recording means disposed on said vessel; cable means connected to said detector for coupling said detector to said recording system as said vessel is moved away from said anchored detector; a circuit means disposed on said vessel to generate an output signal that is proportional to the square of elapsed time from the generation of an acoustical impulse; an oscilloscope, said circuit means being coupled to the sweep circuit of said oscilloscope; measuring means disposed on the vessel to measure and then square the distance between said source and said anchored detector, said measuring means supplying an output signal proportional to the squared distance; said measuring means being coupled to the record advancing means of said recording system and said recording system being disposed to record the events displayed on said oscilloscope.

References Cited by the Examiner
UNITED STATES PATENTS

| | | | |
|---|---|---|---|
| 2,099,536 | 11/37 | Scherbatskoy et al. | 343—100.2 |
| 2,158,198 | 5/39 | Prescott | 181—.53 X |
| 2,729,300 | 1/56 | Paslay et al. | 181—0.5 |
| 2,862,414 | 12/58 | Stephenson | 181—0.5 |
| 2,866,512 | 12/58 | Padberg | 181—0.5 |
| 2,994,397 | 8/61 | Huckabay | 181—0.5 |
| 3,005,184 | 10/61 | Savit | 181—0.5 |
| 3,084,332 | 4/63 | Amery | 340—15.5 |

SAMUEL FEINBERG, *Primary Examiner.*

CARL W. ROBINSON, CHESTER L. JUSTUS,
*Examiners.*